S. TOORNEY.
Mode of Constructing Carriage Wheels.

No. 77,680.  Patented May 5, 1868.

Witnesses:
Wm. F. Browne
A. S. Van Vranken

Inventor:
Samuel Toorney.
By his atty:
Jos. Brown.

United States Patent Office.

SAMUEL TOOMEY, OF WILMOT, OHIO.

Letters Patent No. 77,680, dated May 5, 1868.

IMPROVEMENT IN THE MODE OF CONSTRUCTING CARRIAGE-WHEELS.

*The Schedule referred to in these Letters Patent and making part of the same.*

TO ALL WHOM IT MAY CONCERN:

Be it known that I, SAMUEL TOOMEY, of Wilmot, in the county of Stark, and State of Ohio, have invented an Improvement in the Construction of Carriage-Wheels; and I do hereby declare that the following is a full and exact description thereof, reference being had to the accompanying drawings, making part of this specification—

Figure 1:
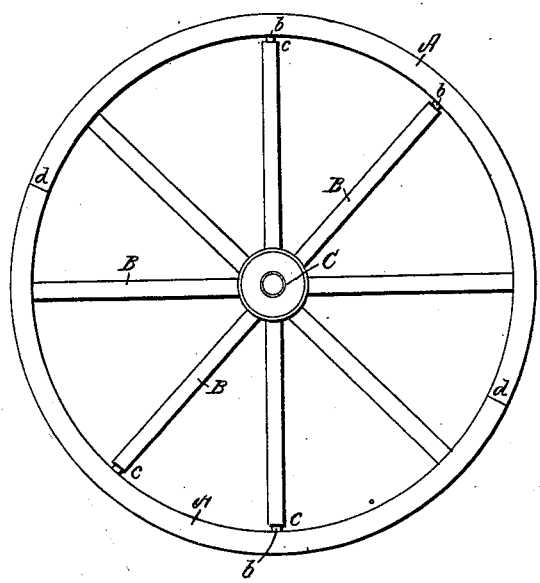

Figure 1 being a side view of a carriage-wheel constructed with my improvement, representing its appearance before the tire is shrunk on.

Figure 2:
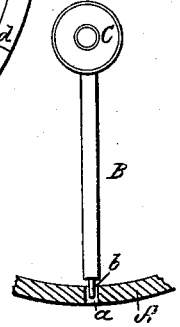

Figure 2, a view of a portion of the wheel, showing a section of a part of the rim or felloe thereof.

Figure 3:
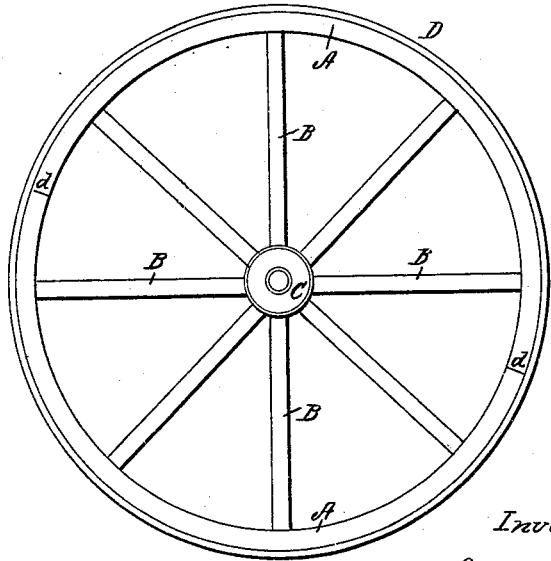

Figure 3, a view of the wheel after the tire has been shrunk on.

Like letters designate corresponding parts in all of the figures.

Let A represent the rim of a wheel, made of a single piece, bent into shape, or of two or more pieces, or in felloes, if bent into form. Let B B represent the spokes, and C the hub.

The usual mode of constructing bent-rim wheels is to fit the rim close to the shoulders, $c$ $c$, of the spoke-tenons $b$ $b$, the joint or joints, $d$, where the ends of the rim abut, being separated slightly before putting on the tire, or sometimes brought nearly together. The trouble with wheels thus put together is, that the seasoning or drying of the wood soon renders the tire loose, and the wheel is soon racked, strained, and weakened.

My invention consists in leaving a space of, say, from a sixteenth to an eighth of an inch between the shoulder, $c$, of each spoke, B, and the interior of the rim before the tire is shrunk on, as represented in fig. 1, the ends, $d$, of the rim abutting close together. This space may be left between every shoulder and the rim, or two or three shoulders may reach to the rim, as shown, to hold the rim in a concentric position.

Then, on shrinking the tire on, the inner edge of the rim is brought tightly against all the shoulders, $c$ $c$, of the spokes, as shown in fig. 3. Thus put together, the wheel remains firm and stiff for many years. Another advantage is, that the wood also remains tight around the tenons against shrinkage.

The tenons, $b$ $b$, should be cut off to the proper length, the thickness of the rim, before entering the holes $a$ $a$ in the rim, fig. 2, so that they will not project when the rim is pressed into position.

What I claim as my invention, and desire to secure by Letters Patent, is—

The method of constructing bent-rim carriage-wheels, with the ends of the rim abutting together, and with spaces between the rim and the shoulders of the spokes, before putting on the tire, and then closing the rim and spoke-shoulders together by the shrinking on of the tire, substantially as and for the purpose herein specified.

The above specification of my improvement in constructing carriage-wheels, signed by me, this 20th day of February, 1868.

SAMUEL TOOMEY.

Witnesses:
J. S. BROWN,
A. S. VAN VRANKEN.